Figure 1:
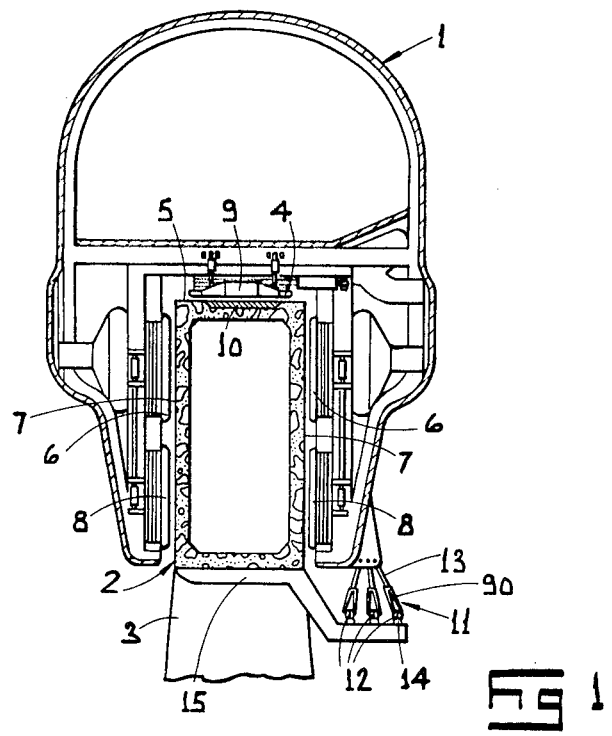

United States Patent [19]
Falkiner-Nuttall

[11] 3,752,274
[45] Aug. 14, 1973

[54] ELECTRIC CURRENT COLLECTOR ARRANGEMENTS

[75] Inventor: George Robert Falkiner-Nuttall, Richmond, England

[73] Assignee: Trucked Hovercraft Limited, London, England

[22] Filed: Sept. 7, 1971

[21] Appl. No.: 178,203

[52] U.S. Cl. .................................. 191/49, 191/59.1
[51] Int. Cl. ............................................. B60l 5/38
[58] Field of Search ................... 191/22, 23, 28, 29, 191/32, 45, 48, 49, 50, 59, 59.1

[56] References Cited
UNITED STATES PATENTS

| 863,509 | 8/1907 | Cleavland | 191/29 |
| 2,942,557 | 6/1960 | Hirsch | 104/134 |
| 3,146,866 | 9/1964 | Frostick | 191/57 |
| 328,420 | 10/1885 | McLaughlin | 191/48 |

Primary Examiner—Gerald M. Forlenza
Assistant Examiner—D. W. Keen
Attorney—G. W. Daisley

[57] ABSTRACT

An electric current collector arrangement for cooperation with an electric conductor rail having three surfaces forming the inside surfaces of a generally channel-shaped concavity. The arrangement has a pair of conductive pick-up members which in operation are together biassed into contact with the centre of the three conductor rail surfaces and are biassed apart into separate guiding engagement with the other two rail surfaces. In the described embodiments the collector arrangements have opposed pairs of pick-up members carried by the arms of bifurcated yoke assemblies.

12 Claims, 9 Drawing Figures

Patented Aug. 14, 1973  3,752,274

4 Sheets-Sheet 1

Patented Aug. 14, 1973 3,752,274

4 Sheets-Sheet 3

Patented Aug. 14, 1973

3,752,274

4 Sheets-Sheet 4

3,752,274

ELECTRIC CURRENT COLLECTOR ARRANGEMENTS

This invention relates to electric current collector arrangements, that is to say, to arrangements for collecting current from a conductor rail extending along a track for use in a vehicle operating along the track.

According to the present invention there is provided an electric current collector arrangement for co-operation in current transfer relationship with an electric conductor rail having two opposed first surfaces and a second surface therebetween forming in combination a generally channel-shaped concavity, the arrangement comprising a plurality of members at least one of which is electrically conductive and adapted for contacting the said second surfaces in current transfer relationship and including at least one opposed pair which are adapted for contacting respective ones of the said first surfaces, the collector arrangement further comprising first biassing means for biassing the or each electrically conductive member into contact with the said second surface and second biassing means for biassing the members of the or each pair apart and into contact with their respective first surfaces.

Preferably the said plurality of members are constituted by the members of the one or more said pairs and are electrically conductive, the second biassing means being arranged for biassing both the members of the or each pair in current transfer relationship with the said first surface.

According to a preferred feature of the invention the current collector arrangement is adapted for co-operation with a conductor rail having two outwardly facing said second surfaces each having a respective said first surface on either side, the collector arrangement comprising a bifurcated yoke assembly having two arms each of which carries a said plurality of members.

Figure 3:
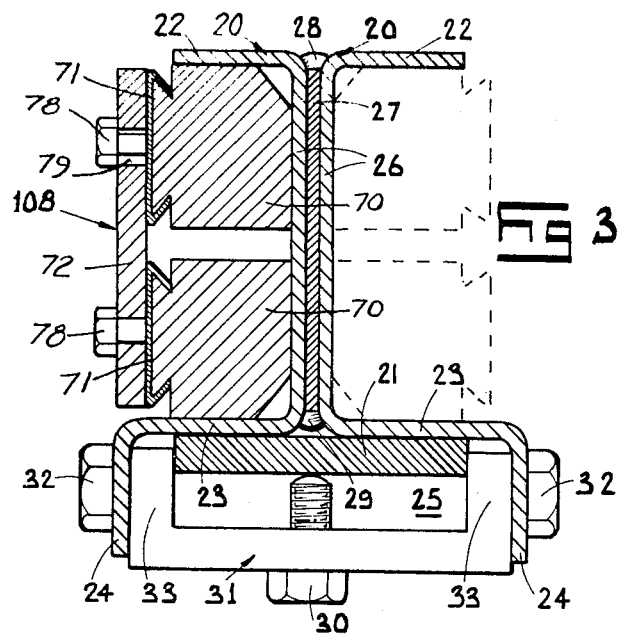
Figure 2:
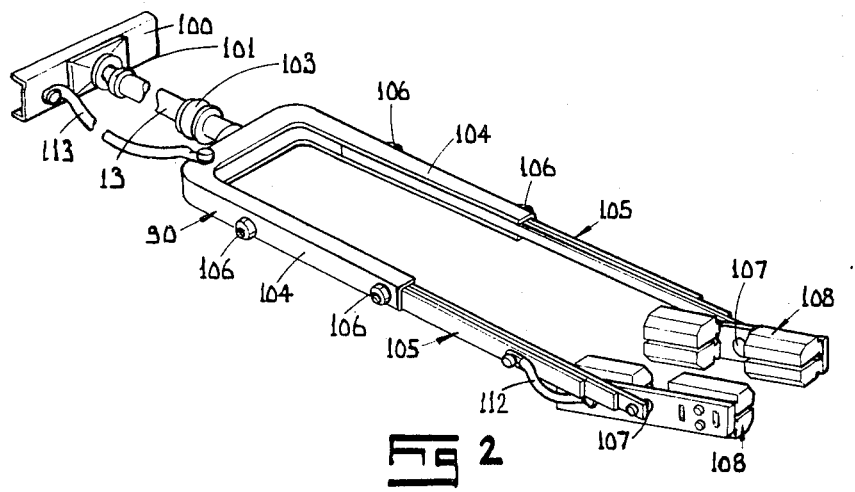
Figure 4:
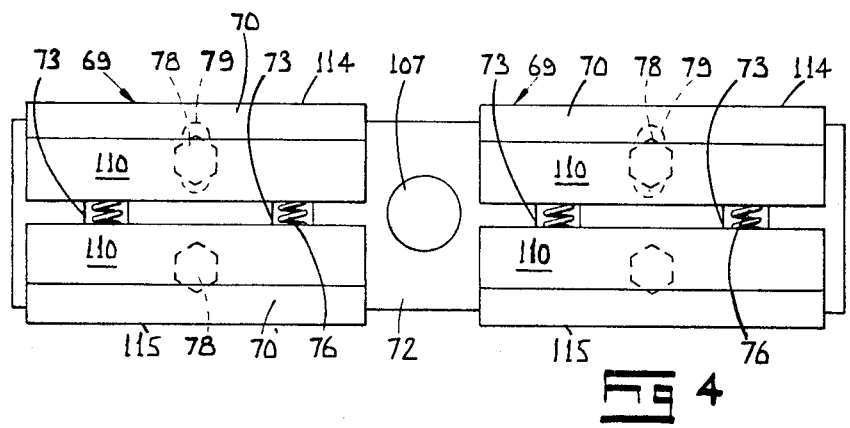
Figure 5:
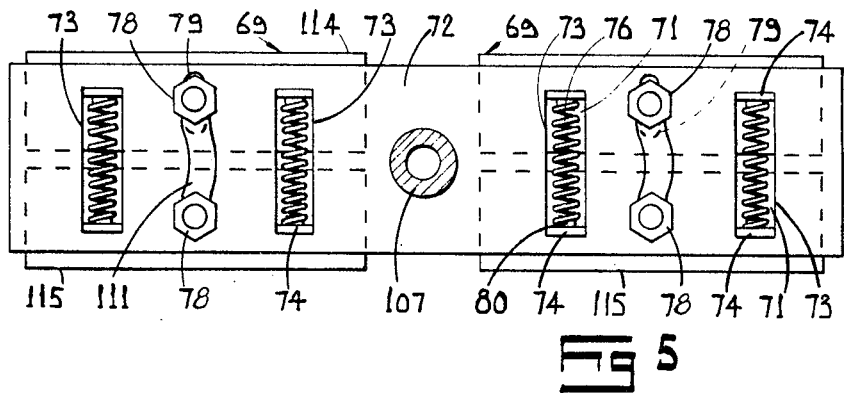
Figure 6:
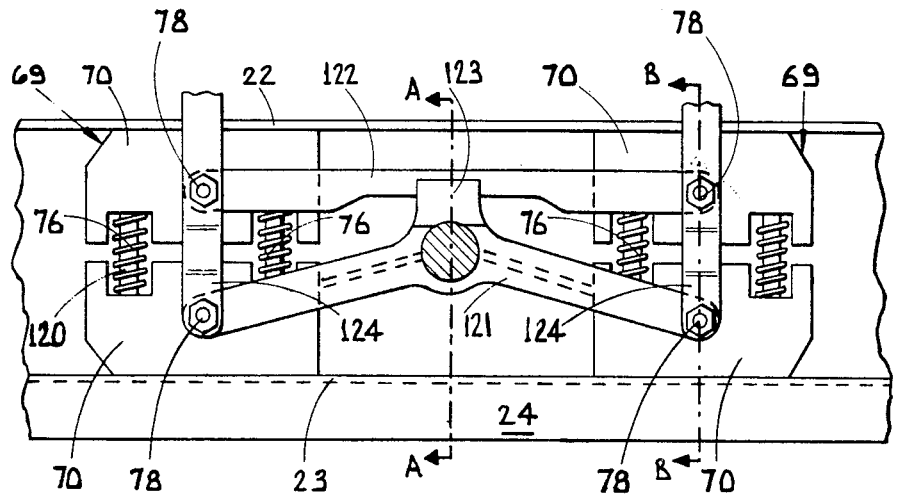
Figure 7:
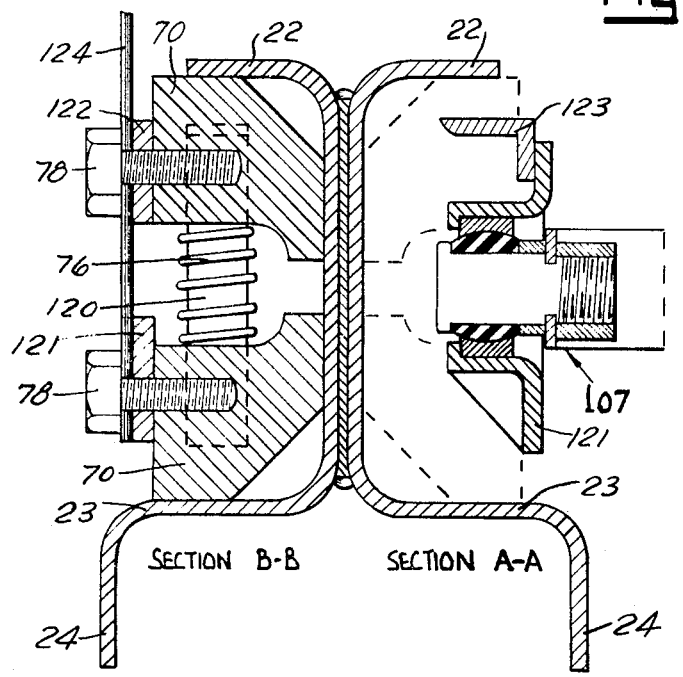
Figure 8:
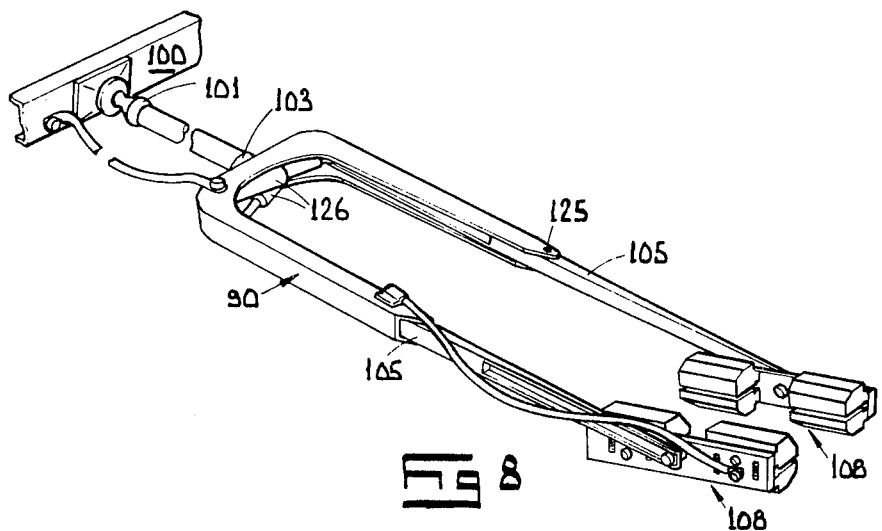
Figure 9:
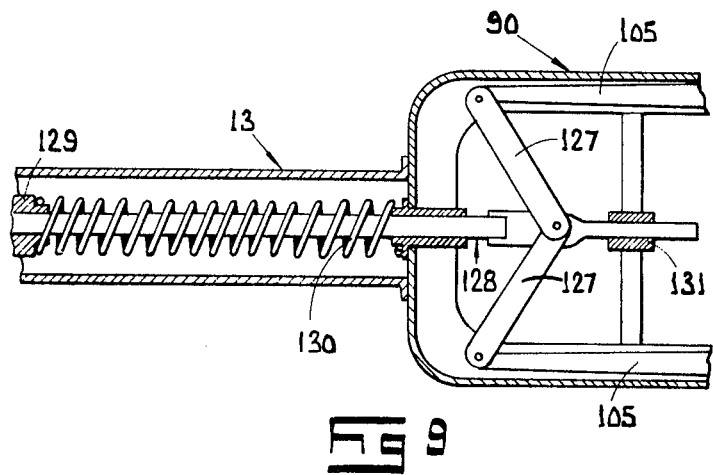

These and other aspects and features of the invention will now become apparent from the following description, given by way of example and with reference to the accompanying drawings, of various collector arrangements embodying the invention. In the drawings:

FIG. 1 shows a gas-cushion vehicle arranged for operation along a prepared track and supplied with three-phase electric power by means of three identical collector arrangements in accordance with the invention in contact with conductor rails extending along the track, FIG. 2 is a perspective view showing one of the collector arrangements of FIG. 1, FIG. 3 illustrates the collector arrangement of FIG. 2 in operation, showing the manner in which it contacts the associated conductor rail, FIG. 4 shows one of the two shoe assemblies at which the collector arrangement of FIG. 2 co-operates with the conductor rail, as seen from the conductor rail, FIG. 5 shows the reverse side of the shoe assembly of FIG. 4, FIG. 6 is a view similar to FIG. 5 showing an alternative shoe assembly, FIG. 7 is a view taken in cross-section partly on the line AA of FIG. 6 and partly on the line BB of that figure, FIG. 8 is a view similar to FIG. 2 of an alternative arrangement for carrying the shoe assemblies of FIGS. 1 assemblies of FIGS. 1 to 7, partly 7, and FIG. 9 is a plan view of part of a further alternative arrangement for carrying the shoe assemblies of FIGS. 1 to 7, partly cut away to show internal detail.

Referring now to FIG. 1 of the drawings, a gas-cushion vehicle 1 is arranged for operation along a rectangular concrete track 2 supported at intervals by supports 3. The vehicle is supported above the track by a flexibly mounted support pad 4 at each end of the vehicle, through the medium of cushions of air generated and maintained between the pads and the horizontal top surface 5 of the track. Likewise, the vehicle is guided along the track by pairs of opposed flexibly mounted guidance pads 6 at the front and rear of the vehicle co-operating, through the medium of cushions of air, with the vertical side surfaces 7 of the track. Further flexibly mounted gas-cushion pads 8 are mounted below the guidance pads 6 at the rear of the vehicle for providing stiffness against vehicle rolling motions due to, for example, side winds.

Propulsive force for the vehicle is provided by a single-sided linear induction motor having its primary member 9 carried by the vehicle body for co-operation with a secondary member 10 extending along the track and inset centrally into the top track surface 5.

Electric power for the primary member 9 and also for the other electrical devices on the vehicle 1 (such as the fans supplying air to the pads 4, 6 and 8) is provided by three pick-up devices 11 which contact respective conductor rails 12 extending in parallel and horizontal relationship along the track.

The pick-up devices are attached to the vehicle body by respective drag arms 13 which extend downwardly and backwardly from the vehicle body. One device and its associated drag arm is shown generally in FIG. 2 from which it will be seen that the drag arm is connected to the vehicle body, indicated generally at 100, by a universal joint 101.

The collector arrangement comprises a rigid bifurcated yoke 90 centrally attached at its outside to the drag arm 13 by a further universal joint 103.

The yoke 90 is of channel-shaped cross-section with the concavity of the channel facing inwardly. The arms 104 of the yoke receive in their concavities the ends of respective composite leaf springs 105 which project equally beyond the ends of the arms 104 and are rigidly attached at 106 to the arms.

At their free ends the leaf springs 105 carry via further universal joints 107, identical collector shoe assemblies 108 now to be described in detail with reference to FIGS. 3 to 5 of which FIG. 3 is a view in transverse cross-section illustrating the operation of the shoe assemblies in co-operation with the associated conductor rail 12. In FIG. 3 only one shoe assembly is indicated (in general outline); the other shoe assembly is identical and forms a mirror image of the first.

The conductor rail comprises opposed contact members 20 which are each generally in the form of a U which is turned on its side and has its upper and lower arms 22, 23 perpendicular to its yoke 26. The members 20 are arranged in back-to-back configuration with their yokes 26 separated by a generally continuous sheet steel spacing member 27. Welds 28, 29 (which may be continuous) are made along the upper and lower edges of the spacing member 27 so as to secure the members 20, 27 together as a rigid structure.

The arms 23 of the contact members 20 are integrally formed at their ends with downwardly turned vertical extensions 24 which, together with the arms 23, form an open-bottomed channel 25 along the bottom of the conductor rail. In this channel is centrally received a conductor 21 which is pressed firmly in position against the underside of the arms 23 by bolts 30 threaded in upwardly facing channel members 31. The channel members 31 are secured to the contact members 20 by bolts 32 passing through the extensions 24 and engaging threaded holes in their arms 33.

Further upwardly facing channel members (not shown) similar in cross-section and disposition to the channel members 31 and likewise bolted to the extensions 24, are engaged on their undersides by, and bolted to, the insulators 14 (FIG. 1) to support the conductor rail at regular intervals along its length.

Each shoe assembly 108 (see FIGS. 3, 4 and 5) comprises a backing plate 72 to which is centrally attached the respective universal joint 107, and two longitudinally spaced two-part carbon shoes 69 the parts 70 of which are individually mounted on the backing plate by means of metal backing members 71.

Of the four shoe parts 70 of each shoe assembly the two lower parts are each securely attached to the backing plate 72 by means of a stud and co-operating nut assembly 78. Assemblies 78 are also provided for the upper shoe parts; for these, however, the backing plate 72 is vertically slotted at 79, the arrangement being such that the upper shoe parts can slide vertically with respect to the backing plate.

In addition to the two slots 79 the backing plate is formed with four further vertical slots 73, two for each shoe 69. As can clearly be seen in FIG. 5, each shoe part 70 has two horizontal (and horizontally disposed) lugs 74 extending from its backing member 71. The lugs 74 project through the slots 73 to spigots 80. Between each spigot and the corresponding spigot of the complementary shoe part, that is to say, longitudinally of the associated slots 73, extends a compression spring 76. In this way the two parts 70 of each shoe are biassed vertically apart at all times.

The slots 73, in addition to allowing for the relative vertical movement of the part 70 of each shoe under the action of the springs 76 also provide, with the studs, location for the shoe parts longitudinally of the rail.

For operation the collector arrangements 11 are mounted as indicated in FIG. 3 so as to engage the respective conductor rails 12 in the manner of a caliper. The relative dimensions of the arrangements 11 and the rails 12 are such that the leaf springs 105 are bent backwardly to a certain extent and so provide a contact pressure ensuring good electrical contact between the front faces 110 of the shoe parts 70 and the co-operating faces of the yokes 26.

Good electrical connection between the shoe parts 70 and the vehicle is provided by flexible electrical connections 111, 112 and 113 of which the connections 111 (FIG. 5) connect the parts of each shoe together by means of thier studs, and the connections 112 and 113 respectively connect the foremost bottom studs of the shoe assemblies 108 to the leaf springs 105 (so bypassing the universal joints 107) and the yokes 90 to the vehicle (so by-passing the universal joints 101, 103). In a modification the connections 111 are directly connected to the backing plates 72 (which are in intimate electrical contact with the lower shoe parts 70).

The conductor rails 12 are energised from the respective phases of a three-phase trackside supply (not shown) and the electrical supply provided to the vehicle via the collector arrangements 11 enables the vehicle to operate along the track at a high speed.

As the vehicle travels along the track the springs 76 previously mentioned cause the two parts of each shoe 69 to engage the arms 22, 23 of the conductor rail yokes 26, the top shoe part engaging the undersurface of the arm 22 at its own upper surface 114, and the lower shoe part likewise engaging the upper surface of the arm 23 at its own lower surface 115. In this way the pick-up devices 11 with the drag arms 13 are guided along the conductor rails 12 despite the upward force exerted upon them by reason of the upward inclination of the drag arms.

In a non-illustrated modification of the pick-up devices 11 of FIGS. 1 to 5 which prevents possible rotation of the upper shoe parts about their studs, each pair of opposed spigots 80 is replaced by a rod and co-operating sleeve; the rod is carried by one shoe part at one end and extends along and within the spring 76 so as at its other end to engage the sleeve, which is carried by the other shoe part in sliding relationship.

FIGS. 6 and 7 show a further shoe assembly 108 in accordance with the invention which can be used with the yoke 90 of FIGS. 1 to 5 as an alternative to the assemblies shown and is described in that context.

As with each assembly of FIGS. 1 to 5, the shoe assembly 108 of FIGS. 6 and 7 comprises two longitudinally spaced shoes 69 having two parts 70 of which the upper part is movable vertically across the face of the co-operating conductor rail 12 and the lower part is fixed in position vertically relative to the conductor rail. The two parts of each shoe are biassed apart into contact with the arms 22, 23 of the conductor rail by two compression springs 76 which are mounted between the shoe parts rather than being mounted outboard of the two parts as in the shoe assembly of FIGS. 1 to 5.

Each spring 76 surrounds a vertical shaft 120 which is secured to the lower shoe part and is slidable in a hole formed in the top shoe part so as to locate the shoe parts with respect to one another both transversely and longitudinally of the conductor rail and to prevent tilting.

Instead of being mounted on an integral backing plate as in FIGS. 1 to 5, in FIGS. 6 and 7 the shoe parts 70 are carried by separate members 121 and 122. The member 121 extends between the lower shoe parts and is connected rigidly to those shoe parts by stud and co-operating nut assemblies 78. Midway along its length the member 121 is connected by a universal joint 107 to the free end of the respective arm of the pick-up device 11, as previously described in relation to FIGS. 1 to 5.

The member 122 is a member which extends between the upper shoe parts and is rigidly secured to those shoe parts at further stud and nut assemblies 78.

A tongue 123 centrally carried by the member 121 adjacent the universal joint 107 engages the back face of the member 122 so as to transmit to the upper shoe parts the inward forces produced by the associated leaf springs 105. The co-operating faces of the member 122 and the tongue 123 are suitably treated so that the two-part shoes 69 can easily expand against the conductor rail arms 22, 23 under the action of the springs 76.

The two parts of each shoe 69 are electrically connected together by flexible connectors 124 which are secured to the shoe parts at their studs and which extend from there to a suitable connection on the associated leaf spring.

The shoe assemblies 108 of FIGS. 1 to 7 can each be mounted so as to engage the co-operating conductor rail 12 in caliper fashion in other ways than that particularly shown and described with reference to FIG. 2; FIGS. 8 and 9 show two other possible arrangements.

In FIG. 8 two shoe assemblies 108 are mounted on a bifurcated yoke 90 similar to that of FIG. 2 and likewise connected to the vehicle body 100 by a drag arm 13 via universal joints 101 and 103. As in FIG. 2, the yoke 90 carries projecting arms 105 which pivotally carry the shoe assemblies 108 at their ends and which produce the required inward forces on the shoe assemblies when in operation. Whereas in FIG. 2, however, the inward biassing forces on the shoe assemblies are produced by the resilient arms 105 themselves, in FIG. 8 the arms are essentially rigid and are centrally pivoted on the yoke 90 at 125. The arms extend within the channel section of the yoke to respective pneumatic rams 126 which individually and pivotally connect their ends to the opposed side of the yoke. In operation pressurised air is supplied to the rams which accordingly expand to produce the desired inward forces on the shoe assemblies.

In various modifications of FIG. 8 the rams 126 are hydraulic or are replaced by compression springs; alternatively only one hydraulic or pneumatic ram or compression spring is provided, connected directly between the ends of the arms 105.

FIG. 9 shows a further modification of the arrangement of FIG. 8 in which the inward biassing force for the shoe assemblies is produced by a spring within the drag arm 13.

In FIG. 9 the ends of the arms 105 remote from the shoe assemblies are pivotally connected via respective links 127 to the projecting end of a composite operating rod 128 concentric with the drag arm 13. From its connection to the links 127 the operating rods extends along the drag arm to a member 129 between which and the attachment of the drag arm to the yoke extends a compression spring 130. It will be seen that this spring will, by urging the member 129 and therefore the operating rod 128 along the drag arm 13 and away from the yoke 90, create the desired inward biassing force on the shoe assemblies 108 (not shown) at the remote ends of the arms 105.

In order to stiffen the operating rod 128 against bending due to unequal forces exerted upon it by the links 127, a bearing 131 is preferably attached to the yoke and arranged to receive that end of the rod 128 nearest the conductor rail in sliding engagement.

In a modification of the arrangement of FIG. 9 the member 129 forms a piston which is slidable along either the inside of the drag arm 13 itself or along the inside of a cylinder specially provided within the drag arm; pressurised air or fluid is admitted to the closed space surrounding the operating rod 128 to produce the required biassing force on the shoe assemblies 108. The spring 130 may then be either omitted or, alternatively, it may be a tension spring so as to separate the shoe assemblies from the conductor rail 12 in the event of a failure of the pneumatic or hydraulic supply.

Although in the described embodiments and the modifications thereof the shoes 69 provide the sole means both for collecting current from the associated conductor rail and for guiding the associated pick-up devices 11 and drag arm 13 transversely of the conductor rail, such an arrangement is not essential. In a modification each shoe assembly 108 includes one or more further, unitary, shoes which perform a substantial part, if not all, of the current collecting function of the shoe assembly by co-operation with the associated conductor rail at the respective yoke 26. The two-part shoes 69 serve primarily to guide the pick-up device and the associated drag arm 13 along the conductor rail in the vertical sense. With such an arrangement the or each unitary shoe may contact the arms 22, 23 only occasionally (if at all); likewise the two-part shoes, which may or may not be connected for passing current, may only occasionally (if ever) contact the respective yoke 26.

The invention is not limited in scope to current collector arrangements which in operation have two-part pick-up members carried in opposed pairs for contact with the sides of the central web of a generally I-shaped conductor rail; it includes within its scope collector arrangements having one or more two-part pick-up members for operation on one side only of the associated conductor rail. With such an arrangement the conductor rail must be mounted to withstand the force biassing the pick-up member or members against it.

I claim:

1. An electric current collector arrangement for co-operation in current transfer relationship with an electric conductor rail having two opposed first surfaces and a second surface therebetween forming in combination a generally channel-shaped concavity, the arrangement comprising a plurality of members consisting of at least one opposed pair of members which are adapted for contacting respective ones of the said first surfaces, at least one of the said plurality of members being electrically conductive and adapted for contacting the said second surface in current transfer relationship, the collector arrangement further comprising first biassing means for biassing the electrically conductive member into contact with the said second surface, and second biassing means for biassing the members of said opposed pair apart and into contact with their respective first surfaces.

2. A current collector arrangement according to claim 1, wherein the said plurality of members are constituted by at least one opposed pair of electrically conductive members, the first biassing means being arranged for biassing the members into contact with the said second surface, and the second biassing means being arranged for biassing both of the members of the said pair into current transfer relationship with their respective first surfaces.

3. A current collector arrangement according to claim 2, which includes two said pairs of members and connecting means connecting the two pairs of members together for co-operation in longitudinally spaced relationship with the first and second surfaces of the conductor rail, the connecting means comprising first and second connections separately connecting each member with the corresponding member of the other pair, a first of the said connections being attached by a universally pivotal attachment to a member which, in operation, transmits to the connecting means, and thereby the said plurality of members, both the biassing force produced by the first biassing means and also any propulsive force tending to cause the collector arrangement to travel longitudinally of the conductor rail, the connections being arranged for relative movement in generally parallel relation to the second surface of the conductor rail and in a manner which is capable of transmitting the biassing force and the propulsive force from the first connection to the second connection.

4. A current collector arrangement according to claim 1, which includes two said pairs of opposed members and connecting means connecting the two pairs of members together for cooperation in longitudinally spaced relationship with the associated conductor rail at at least the first surfaces thereof, the connecting means being attached by a universally pivotal attachment to a member which, in operation, transmits to the connecting means both the biassing force produced by the first biassing means and also any propulsive force tending to cause the collector arrangement to travel longitudinally of the conductor rail.

5. A current collector arrangement according to claim 4, wherein the connecting means comprises a unitary member having the plurality of members attached thereto, the members of the said opposed pair being arranged for relative movement across the said unitary member in generally parallel relation to the second surface of the conductor rail.

6. A current collector arrangement according to claim 1 and adapted for co-operation with a conductor rail having two outwardly facing said second surfaces each having two opposed first surface on either side, the collector arrangement comprising a bifurcated yoke assembly having two arms each of which carries a said plurality of members.

7. A current collector arrangement according to claim 6, wherein the yoke assembly comprises a rigid yoke having two arms to which are secured projecting leaf springs each having a said plurality of members connected to their free ends, the leaf springs constituting the first biassing means.

8. A current collector arrangement according to claim 6, wherein the yoke assembly comprises a rigid yoke having two arms, and two generally parallel arm members pivotally attached intermediate their lengths to respective ones of the said arms, each arm member carrying at one end the respective said plurality of members and at its other end being subject, in operation, to biassing force produced by the first biassing means.

9. A current collector arrangement according to claim 8, wherein the first biassing means comprises separate biassing devices individually connecting the arm members to the yoke.

10. A current collector arrangement according to claim 8, wherein the first biassing means comprises an operating rod mounted on the yoke in generally parallel relation to the arm members, a pair of links separately connecting the operating rod to the arm members in a pivotal manner, and a biassing device for producing a force on the operating rod in its longitudinal direction so as by means of the links and the arm members to produce biassing force on each of the said pluralities of members.

11. A current collector arrangement as claimed in claim 1 in co-operation with the said conductor rail.

12. A gas-cushion vehicle having a current collector arrangement as claimed in claim 1.

* * * * *

UNITED STATES PATENT OFFICE
CERTIFICATE OF CORRECTION

Patent No. 3,752,274    Dated August 14, 1973

Inventor(s) George Robert Falkiner-Nuttall

It is certified that error appears in the above-identified patent and that said Letters Patent are hereby corrected as shown below:

Cover page, item [73], "Trucked" should read --Tracked--; after item [21], insert --[30] Foreign Application Priority Data September 8, 1970 Great Britain 42978/70--. Column 7, line 32, "surface" should read --surfaces--.

Signed and sealed this 18th day of December 1973.

(SEAL)
Attest:

EDWARD M. FLETCHER, JR.
Attesting Officer

RENE D. TEGTMEYER
Acting Commissioner of Patents